US010282458B2

(12) United States Patent
Gupta et al.

(10) Patent No.: US 10,282,458 B2
(45) Date of Patent: May 7, 2019

(54) EVENT NOTIFICATION SYSTEM WITH CLUSTER CLASSIFICATION

(71) Applicant: VMWARE, INC., Palo Alto, CA (US)

(72) Inventors: Gaurav Gupta, Bangalore (IN);
Mohak Rajendra, Bangalore (IN);
Arunvijai Sridharan, Bangalore (IN);
Vibhu Rastogi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 912 days.

(21) Appl. No.: 14/846,836

(22) Filed: Sep. 7, 2015

(65) Prior Publication Data

US 2016/0364467 A1   Dec. 15, 2016

(51) Int. Cl.
*G06F 17/30* (2006.01)
*G06N 99/00* (2019.01)

(52) U.S. Cl.
CPC ..... *G06F 17/30598* (2013.01); *G06N 99/005* (2013.01)

(58) Field of Classification Search
CPC .......... G06F 17/30598; G06F 17/3071; G06F 17/30707; G06F 17/30705; G06N 99/005
USPC ........................................................ 706/12
See application file for complete search history.

(56) References Cited

U.S. PATENT DOCUMENTS

| | | | | |
|---|---|---|---|---|
| 9,336,484 B1 * | 5/2016 | Iverson | ............. | G06F 17/30539 |
| 2007/0282777 A1 * | 12/2007 | Guralnik | ............. | G05B 23/0254 |
| | | | | 706/48 |
| 2013/0346594 A1 * | 12/2013 | Banerjee | ............. | G06F 11/3409 |
| | | | | 709/224 |
| 2014/0096249 A1 * | 4/2014 | Dupont | ................... | G06F 21/00 |
| | | | | 726/23 |
| 2014/0165207 A1 * | 6/2014 | Engel | .................. | H04L 63/1425 |
| | | | | 726/25 |
| 2014/0172371 A1 * | 6/2014 | Zhu | ...................... | G06F 11/0709 |
| | | | | 702/185 |
| 2014/0180980 A1 * | 6/2014 | Hido | ..................... | G06N 99/005 |
| | | | | 706/12 |
| 2015/0033086 A1 * | 1/2015 | Sasturkar | ............ | G06F 11/0709 |
| | | | | 714/57 |
| 2015/0332680 A1 * | 11/2015 | Crockett | ............... | G10L 19/008 |
| | | | | 381/23 |

(Continued)

OTHER PUBLICATIONS

Ullman et al., "Unsupervised learning, Clustering", 2014.*

*Primary Examiner* — Dave Misir
(74) *Attorney, Agent, or Firm* — Clayton, McKay & Bailey, PC

(57) ABSTRACT

An event-notification system provides for monitoring resource-status parameters so as to repeatedly generate resource-status values for each of N resource-status parameters applicable to the resources. Each datapoint specifies a resource, a time of collection, and the values of parameters for the resource at the time. The datapoints are represented in an N-dimensional space, including N dimensions corresponding to the resource-status parameters and one dimension devoted to time. The datapoints are clustered on a proximity basis. The clusters are manually classified as Normal or Ack-Abnormal. A machine-learning engine develops a model that allows the classifications to be automated. Alerts are sent for respective Abnormal clusters rather than for each abnormal datapoint, thus reducing the amount of data an administrator must deal with to address potential problems.

15 Claims, 9 Drawing Sheets

(56) References Cited

U.S. PATENT DOCUMENTS

2016/0300049 A1* 10/2016 Guedalia ............... G06F 21/316
2016/0342903 A1* 11/2016 Shumpert ............ G06N 99/005

* cited by examiner

EVENT NOTIFICATION SYSTEM WITH CLUSTER CLASSIFICATION

RELATED APPLICATIONS

Benefit is claimed under 35 U.S.C. 119(a)-(d) to Foreign application Serial No. 2991/CHE/2015 filed in India entitled "EVENT NOTIFICATION SYSTEM WITH CLUSTER CLASSIFICATION", on Jun. 15, 2015, by VMware, Inc., which is herein incorporated in its entirety by reference for all purposes.

BACKGROUND

A data center is a facility used to house computing equipment. Large data centers can include tens of thousands of servers (i.e., computers that provide services to other computers), as well as other resources, e.g., storage devices, networking devices, operating systems, software applications, etc. Events, including demand spikes, denial-of-service attacks and unauthorized intrusions, brownouts or other facilities-related problems, network failures, etc., can affect large numbers of resources. To proactively address potentially impactful events, the status of each of these resources can be monitored. For example, the peak and time-averaged processor utilization, memory utilization, and network bandwidth utilization can be measured periodically, e.g., every five minutes, to check for possible abnormal conditions. If an abnormality is detected, an alert can be generated so that the abnormality can be timely addressed.

DETAILED DESCRIPTION

Status monitoring for all resources in a data center can generate much more data than a human or a team of humans can possibly evaluate. For example, monitoring ten parameters for each of 100,000 (1 lakh) servers can yield a million datapoints per evaluation period. Accordingly, it is desirable to reduce the amount of information that must be reviewed by humans without unduly compromising the ability to issue alerts for events that require attention.

The approach taken herein involves clustering of datapoints, each of which can represent multiple metrics (i.e., values of status parameters). The clusters can then be classified, e.g., as representing abnormal or normal activity. During a manual training phase, clusters are classified by humans. Based on the manual classifications, a machine-learning engine develops a model for predicting classifications of clusters. Once the model is generated, it can be used, during an automated phase, to partially or completely automate cluster classification. Alerts can then be sent per cluster representing abnormal activity, rather than for each metric representing abnormal activity. Thus, the amount of information presented to an administrator is reduced in proportion to the average number of datapoints per cluster representing abnormal activity.

Figure 1:
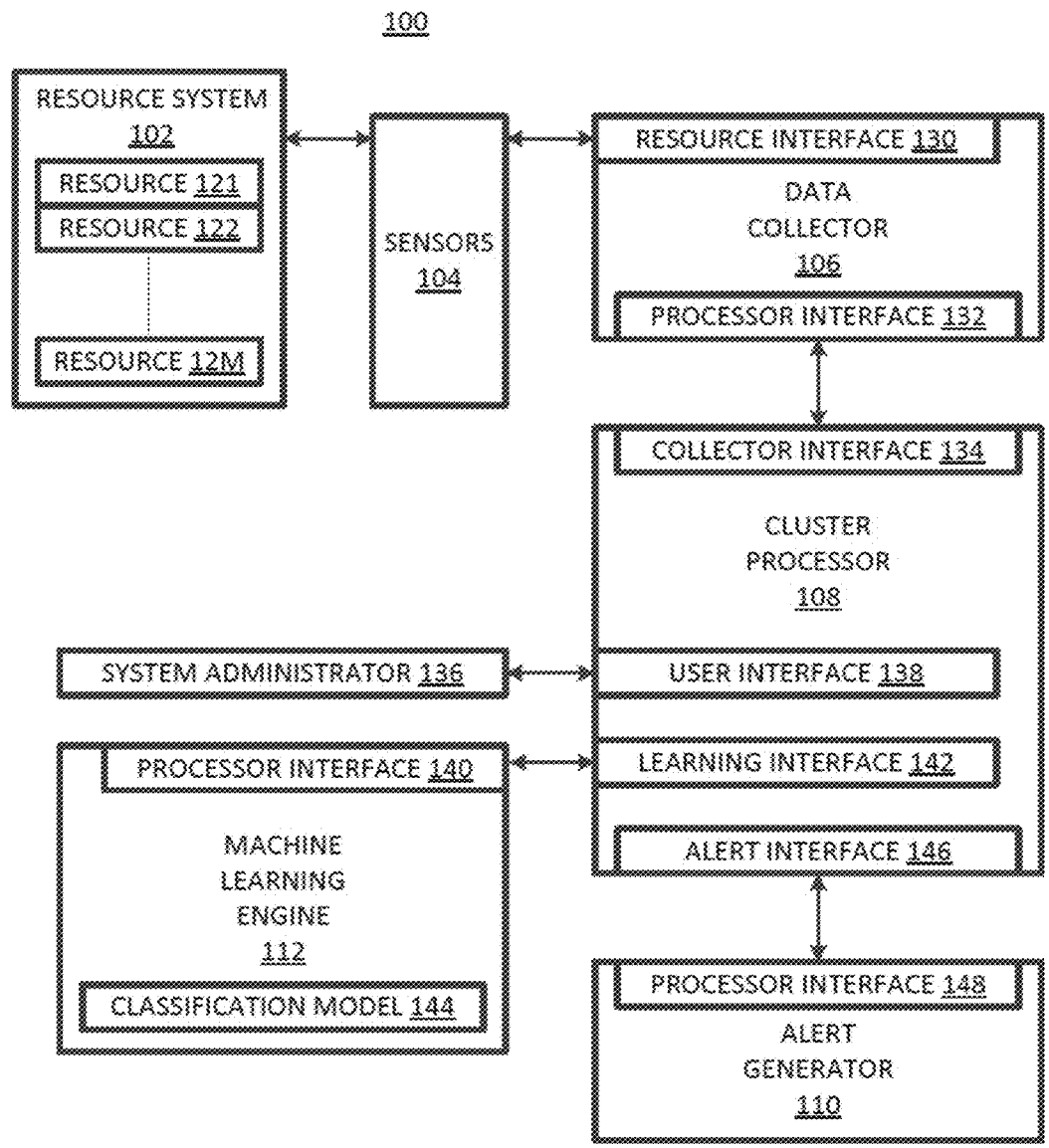
FIG. 1 is a schematic diagram of an event notification system.

An event-notification system 100 is shown in FIG. 1 including a resource system 102 to be monitored, sensors 104, a data collector 106, a cluster processor 108, an alert generator 110, and a machine learning engine 112. Resource system 102 includes M resources 121, 122, . . . 12M, wherein M is a counting number, typically greater than 1000. The resources can be, for example, physical servers of a data center. However, in various embodiments, the resources can include, by way of example and not of limitation, virtual servers, storage devices, cars or other motorized vehicles, telecommunications switches, refrigerated shipping containers, operating systems, applications and other programs, etc. Also, the resources may be geographically distributed or co-located.

At any given time, the status of each of the resources can be characterized by values of a set of N resource-status parameters (i.e., attributes or metrics). Equivalently, the status at any given time can be expressed as an N-dimensional vector or a point in an N-dimensional status-parameter space. As status can vary over time, the values can be assessed repeatedly, resulting in a temporal series of resource-status datapoints. These datapoints can be arranged in an N+1 dimensional space including N status parameter dimensions and one (1) time dimension.

For example, the status of a server can be characterized by status parameters such as processor utilization, memory utilization, storage utilization, bus bandwidth utilization, network bandwidth utilization, total and component power consumption, total and component temperature, error rates, transaction rates, response times, etc. In addition to values for the most recent evaluation period, cumulative and averages may be tracked over plural time periods. Other status parameters may be used for assessing server status. Other resources can have different sets of status parameters.

Sensors 104 are used to evaluate the status parameters for each of a temporal series of evaluation periods. The sensors can include temperature sensors, power-consumption sensors, and other sensors. Some parameters, e.g., processor utilization, do not require sensors that are distinct from the resource being evaluated. Accordingly, in some embodiments there are no sensors other than those inherent in the resources being monitored.

Data collector 106 serves to collect resource-status data and organize it into datapoints. Accordingly, data collector 106 includes a resource interface 130 for coupling to sensors 104 and resources 121-12M. Each datapoint identifies a resource, a time of data collection, and the status-parameter values for the identified resource at the collection time. The datapoints are transmitted via a (cluster) processor interface 132 to cluster processor 108 via the latter's collector interface 134.

One of the features of event-notification system 100 is that datapoints are arranged in clusters so that one alert can be sent for an entire cluster as opposed to sending an alert for each datapoint in a cluster or even each abnormal status parameter. To reduce the number of alerts generated, cluster processor 108 groups datapoints by similarity as indicated by proximity in a multi-dimensional status-parameter space. Scales for the dimensions are normalized so that equal distances in different dimensions correspond, at least roughly, to the same degree of change in normality vs. abnormality.

For normalized spaces, the Euclidean distance (i.e., the ordinary straight-line distance in Euclidean space) between datapoints can be used to determine similarity/proximity. Two datapoints within a threshold Euclidean distance k1 of each other can be assigned to the same cluster, where k1 is small enough that it is unlikely that if one of the datapoints represents a normal status that the other represents an abnormal status. Once a cluster of two or more datapoints is formed, a centroid for the cluster can be determined. Further datapoints can be added to the cluster if they are within distance k1 of the cluster centroid. If a datapoint is within the distance k1 of two or more clusters, it is added to the cluster with the centroid closest to the datapoint. In some embodiments, non-Euclidean distance criteria are used to determine clustering.

Figure 2:
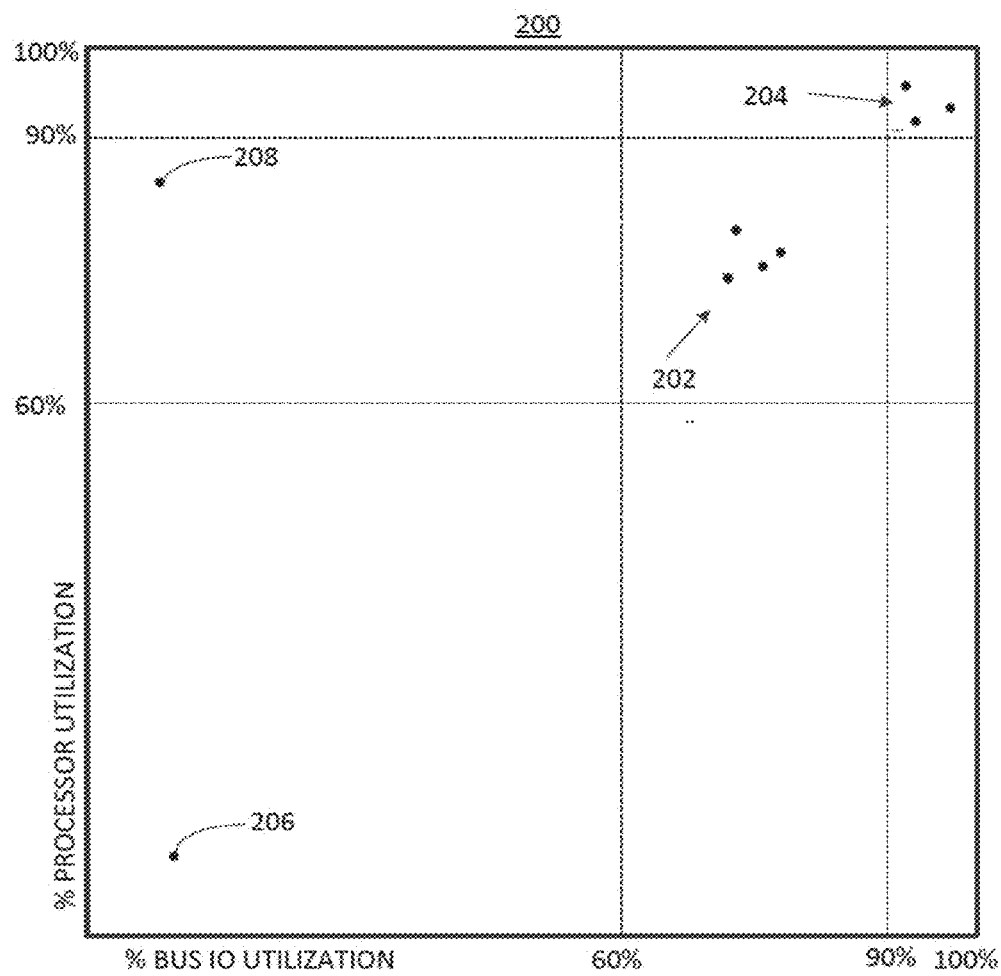
FIG. 2 is a plot illustrating certain facets of the system of FIG. 1.

A graph 200 for a simplified event-notification system is presented in FIG. 2. An x-axis is used to represent percent bus 10 utilization, while a y-axis is used to represent percent processor utilization. These two axes define a two-dimensional server-status space. Nine datapoints are distributed in the space, each representing a different server. The statuses are presented for a single time, so the time dimension is not represented in FIG. 2.

Four datapoints 202 correspond to processor utilization and input-output (IO) bandwidth utilization between 60% and 90%. In this example, the range from 60%-90% represents a normal status in which resources are neither underused nor overused. Three datapoints 204 correspond to utilization over 90%, which might be a concern since there might be insufficient headroom to handle a spike in demand; alternative, over 90% utilization might represent some sort of malfunction. Utilization below 60%, as indicated by datapoint 206, might indicate a condition in which it might be preferable to consolidate workloads on different servers so that one could be shut down to save power. Datapoint 208 represents a situation in which processor utilization is quite high, while IO utilization is quite low. Depending on the nature of the workload being handled, this might or might not indicate a problem.

Since datapoints 202, 204, 206, and 208, represent normal and desirable statuses, no alerts would be sent regarding them. Datapoints 206 and 208 might represent abnormal statuses, so alerts would be sent for them, erring on the side of too much notice rather than too little. However, instead of sending three alerts for each of datapoints 204, these datapoints are treated as a cluster for which one alert will suffice. In a typical system with tens of thousands of resources, clusters may represent tens and hundreds of resources, resulting in substantial reductions in the numbers of alerts that must be generated. Also, the alert for the cluster including datapoints 204 can be given priority over the single-point "clusters" associated with datapoints 206 and 208, as clusters with higher datapoint numerosity would be ranked higher than clusters with lower datapoint numerosity.

Note that, if the status-parameter values for a resource do not change from one evaluation period to the next, then it is unlikely that the resource's status would have changed from normal to abnormal or from abnormal to normal. Accordingly, datapoints taken at different but not too distant times may be proximate in an N+1 dimensional space for purposes of clustering. Clustering datapoints over time results in a further reduction in alerts with respect to systems that cluster only concurrent datapoints. In some embodiments, datapoints taken at different times are not clustered together.

Once clusters are formed, they can be classified. Prior to any act of classification, clusters can be considered "unclassified" or they can be assigned a default classification. Depending on the embodiment, it may or may not be a requirement that all clusters be classified or reclassified. In one classification scheme, clusters are classified either: 1) as representing a condition in which an alert is to be sent; or 2) as representing a condition for which an alert is not needed. The number and significance of cluster classes varies among embodiments. In one embodiment, clusters are assigned to an "Abnormal" class by default Some of the Abnormal clusters can be reclassified to an Acknowledged Abnormal class, some can be reclassified to a Normal class, while others may remain Abnormal.

Initially, cluster classification can be performed manually (e.g., by a system administrator 135), e.g., via a user interface 1138 of cluster processor 108. In many cases, a system administrator may have contextual knowledge that bears on classification. For example, the administrator may know what workloads are run using what resources and at what times. Likewise, the administrator may have experience with demand patterns, e.g., day demand versus night demand, weekday demand versus weekend demand, and holiday demands.

To ease the burden on the administrator, it is desirable to automate the classification process as much as possible. Accordingly, a machine-learning engine 112, via its processor interface 140, communicates with cluster processor 108, via the latter's learning interface 142. This allows machine-learning engine 112 to track manual classification decisions to look for patterns. Detected patterns in classification can be used to build a classification model 144 that predicts classification decisions that would be made manually. Once the model is generated, it can be used to partially or completely automate classification decisions. For example, the model can be used to make first-pass classifications that can be confirmed or changed by an administrator. Reclassifications by the administrator can be tracked and used to refine the model, with an end to total automation of the classification process.

Depending on the embodiment, further cluster processing can take place after classification. For example, clusters of the same class or of compatible classes may be agglomerated to reduce the total number of clusters. For example, clusters of the same or compatible classifications for which the centroids are within a threshold Euclidean distance k2 of each other may be combined into a single cluster. Depending on the embodiment, the agglomeration Euclidean distance threshold k2 may or may not equal the Euclidean distance threshold k1 for adding points to a cluster. Furthermore, clusters may be ranked by class and by the number of included datapoints.

Once cluster processing is complete, data regarding clusters calling for alerts can be transmitted, via alert interface 145 of cluster processor 108 and processor interface 148 of alert generator 110, to alert generator 110 to transmit alerts to appropriate automated and human entities including system administrator 136. The number of alerts is relatively small, corresponding to the number of abnormal clusters rather than the number of abnormal datapoints or abnormal resource-status values. However, the administrator's job can be further eased by prioritizing alerts, e.g., by the respective classes and/or numbers of included datapoints for the respective clusters.

Event notification can be further understood with respect to a system 300 including a processor 302, communications devices 304, and non-transitory media 306. Media 306 is encoded with code 308 that, when executed by processor 302, causes processor 302 to implement an event-notification process 310. Process 310 can be implemented in system 100 and in other systems.

At 311, an event occurs. The event can be an increase or decrease in demand, a change in the type of demand, an equipment or other resource failure, an intrusion, etc. At 312, resource-status parameter values are collected for each of plural comparable resources; in other words, status parameters are measured and the measurements organized according to resource and time to define datapoints. Typically, the measurement data is collected periodically or otherwise repeatedly whether or not an event of interest has occurred. The measurements are associated with resource identifiers and time stamps indicating the time of collection to define resource-status datapoints.

At 313, groups of similar datapoints are formed. To this end, the datapoints can be represented in a space for which the status parameters are dimensions. Dependent on the embodiment, the space can have an additional dimension for time. Datapoints can then be clustered on a proximity basis. For example, a Euclidean distance threshold k1 can be set. Datapoints that are closer to each other than k1 can be considered part of the same cluster. Once a cluster has formed, the distance from the cluster centroid can determine whether an additional datapoint is to be added the cluster. The centroid can be recalculated when a new datapoint is added to the cluster.

At 314, clusters are classified or, if a default classification has been applied, re-classified. During a manual training phase, a user classifies clusters; during a subsequent automatic phase, clusters are classified automatically, either with or without user ratification. For system 300, completely automatic classification of clusters is the default during the automatic phase: there is no manual ratification or reclassification absent a user request.

At 315, during the manual training phase, a machine-learning engine monitors the user classifications and generates therefrom a model that predicts the classifications. Note that since the datapoints specify resources and times, both time and resource can be considered as factors in determining a classification. For example, a utilization pattern (e.g., associated with a system backup operation) that would be considered abnormal during daytime might be considered normal at night. During the automatic phase, the predictive classification model is used at 314 in making the automated classifications.

At 316, pre-agglomeration clusters of the same or compatible classes are agglomerated on a similarity or proximity basis. For example, if the centroids of two clusters are within a threshold distance k2 apart, they can be combined into a single cluster unless their classes are incompatible. k2 can equal k1 or be different. For example, a normal cluster cannot be combined with an acknowledged abnormal cluster regardless of proximity. Agglomeration reduces the total number of clusters and, in most cases, the number of corresponding alerts to be handled by a user.

At 317, clusters are ranked according to classification and/or the respective numbers of datapoints. At 318, alerts are issued, e.g., to the system administrator and other appropriate persons and entities. The alerts can be prioritized according to the ranks of the respective clusters. In general, there will be no alerts for some clusters, e.g., those classified as normal.

In many cases, the risk associated with a false negative (not sending an alert when an alert should have been sent) is greater than the risk associated with a false positive (sending an alert when none was needed). Accordingly, system 400 provides for a default classification of clusters as representing abnormal activity.

System 400 includes a processor 402, communications devices 404, and non-transitory storage media 406. Media 406 is encoded with code 408 that, when executed by the processor, causes the processor to implement a process 410. At 411, a number N of metrics are monitored, e.g., for each of plural resources of a system and for each of plural time periods. At 412, an event occurs. This may be an event that is external to the system being monitored that affects the system or it may be an event internal to the system. At 413, values are acquired for the metrics, e.g., using sensors and taking measurements. In practice, the occurrence of the event is what process 410 is designed to detect. Accordingly, in each time period, values are acquired whether or not an event has occurred.

At 414, the metric values are arranged as metric points in an N+1 dimensional space including N dimensions corresponding to the N metrics and an additional dimension corresponding to the time the values were collected. At 415, the plotted points are grouped into clusters which are classified as "Abnormal", representing abnormal activity. This is a default classification designed to avoid false negatives (not sending alerts when an alert is needed).

The clusters are defined by similarity as indicated by proximity in the N+1 dimensional space. For example, points separated by a distance d less than a threshold Euclidean distance k apart are considered part of the same cluster. Once a cluster is formed, points within the threshold Euclidean distance k from the cluster centroid are treated as part of the cluster. Points that are not within a cluster are assigned to new clusters. Once the clusters are formed, an alert may be sent to a user indicating that the user is to re-classify the clusters as Normal or Ack-Normal.

Figure 5:
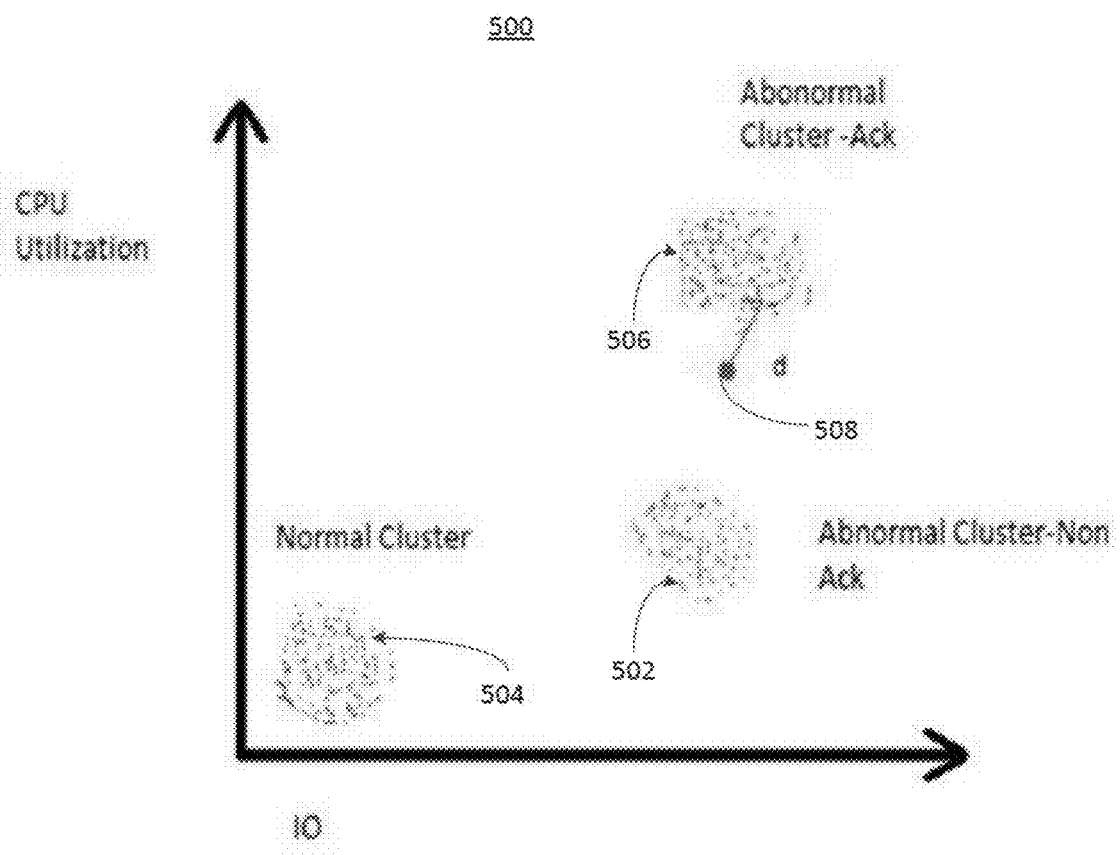
FIGS. 5-7 are screen shots of cluster plots for the event notification system of FIG. 1.

FIG. 5 is a screen shot of a graph 500 of datapoints in a resource-status parameter space. For ease of visualization, only two dimensions are represented: IO utilization and processor (CPU) utilization. The datapoints are arranged in clusters 502, 504, and 506. Cluster 502 has a default Abnormal classification. Cluster 504 has been re-classified as Normal. Cluster 506 has been reclassified as "Ack-Abnormal", i.e., acknowledged as representing abnormal activity.

Figure 6:
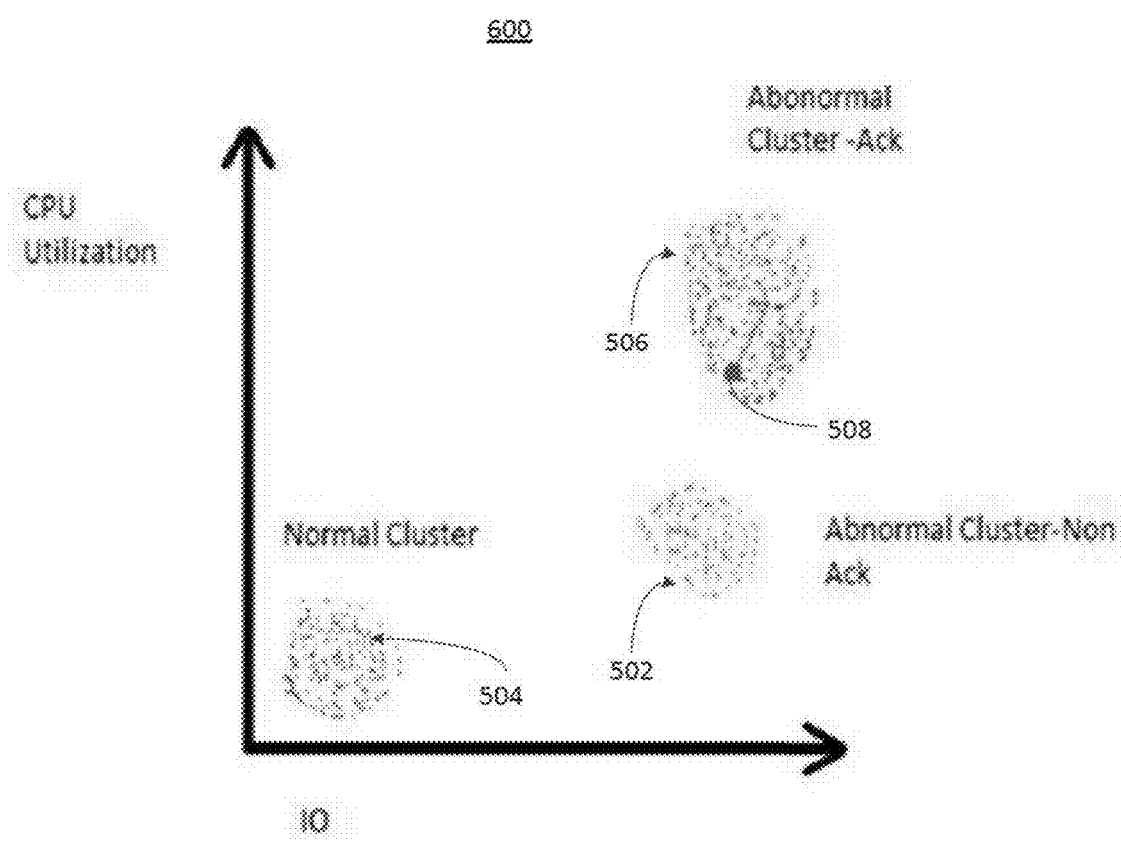

An additional datapoint 508 is under consideration for inclusion in a cluster. It is further than the threshold Euclidean distance k from the non-acknowledged Abnormal cluster 502 and from the Normal cluster 504, so datapoint 508 cannot be included in either of those. However, datapoint 508 is a Euclidean distance d<k from a centroid of Ack-Abnormal cluster 506. Accordingly, datapoint 508 can be included in Ack-Abnormal cluster 506, as shown in graph 600 of FIG. 6.

Figure 7:
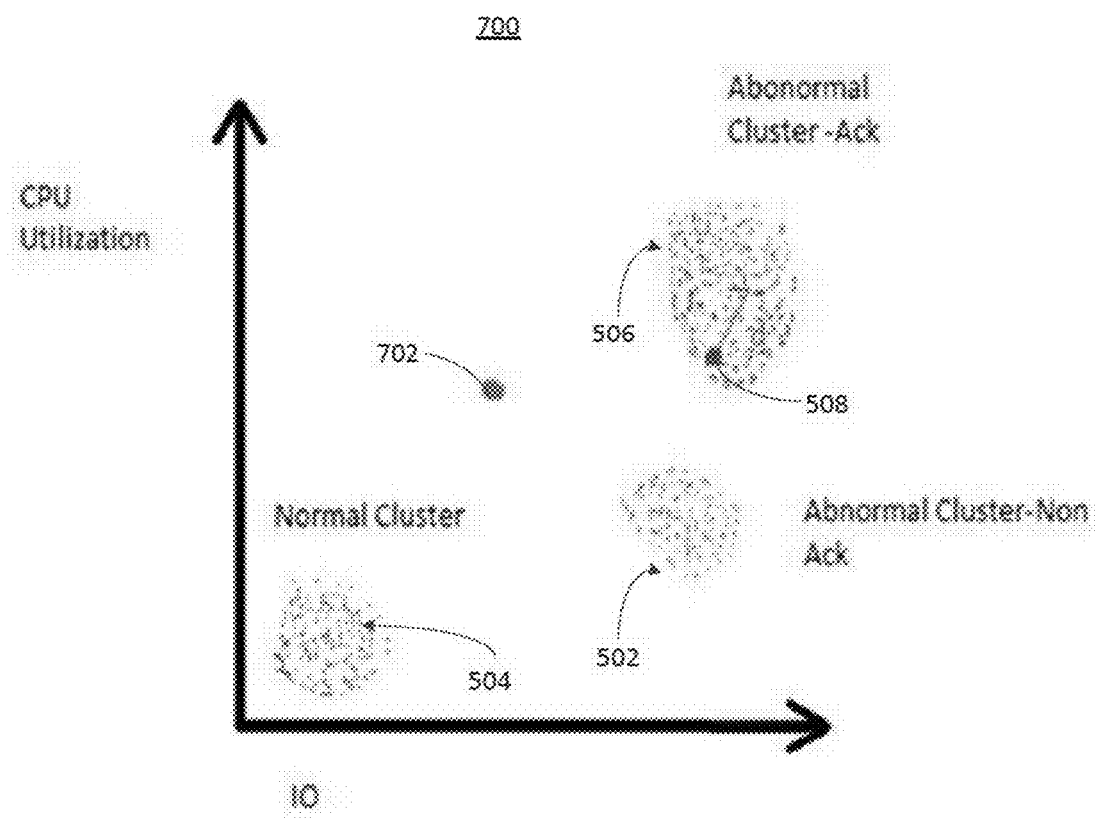

In graph 700 of FIG. 7, an additional datapoint 702 is under consideration for inclusion in a cluster. However, its distance from the centroid of any existing cluster 502, 504, 506, is greater than the Euclidean distance k. Accordingly, it is treated as a new (unacknowledged-default) Abnormal cluster awaiting reclassification.

Figure 4:
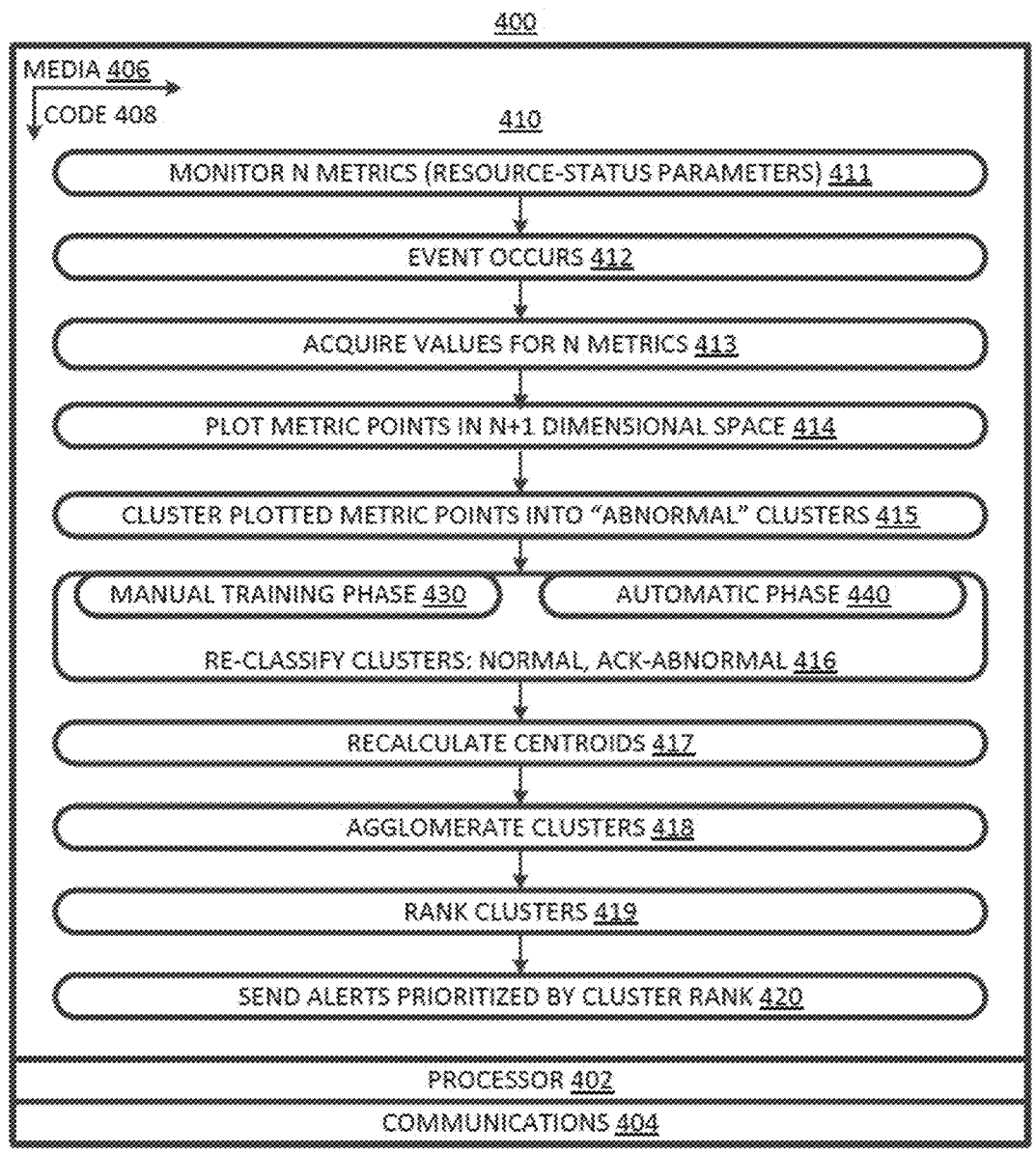
FIG. 4 is a schematic diagram of another computer for implementing an event notification process.

Process 400, FIG. 4, is an iterative process. Early iterations fall within a "manual" or "training" phase 430, while later iterations fall within an "automatic" phase 440. During manual phase 430, re-classification 416 involves an administrator or other user manually re-classifying clusters from the default "Abnormal" classification either to an Ack- Abnormal class (representing activity acknowledged as abnormal) or to a Normal class (representing activity identified as normal).

Manual phase 430 is also a training phase in that manual re-classification decisions at 416 are tracked by a machine-learning engine, which uses the decisions to develop a model to predict future re-classification decisions. The model is then used during automatic phase 440 to make re-classification decisions at 416 without requiring human-attended input. However, in some embodiments, an administrator can check over automated classifications and confirm them or change them. In some cases, any changes can be fed back to the machine-learning engine to improve the predictive model.

Figure 8:
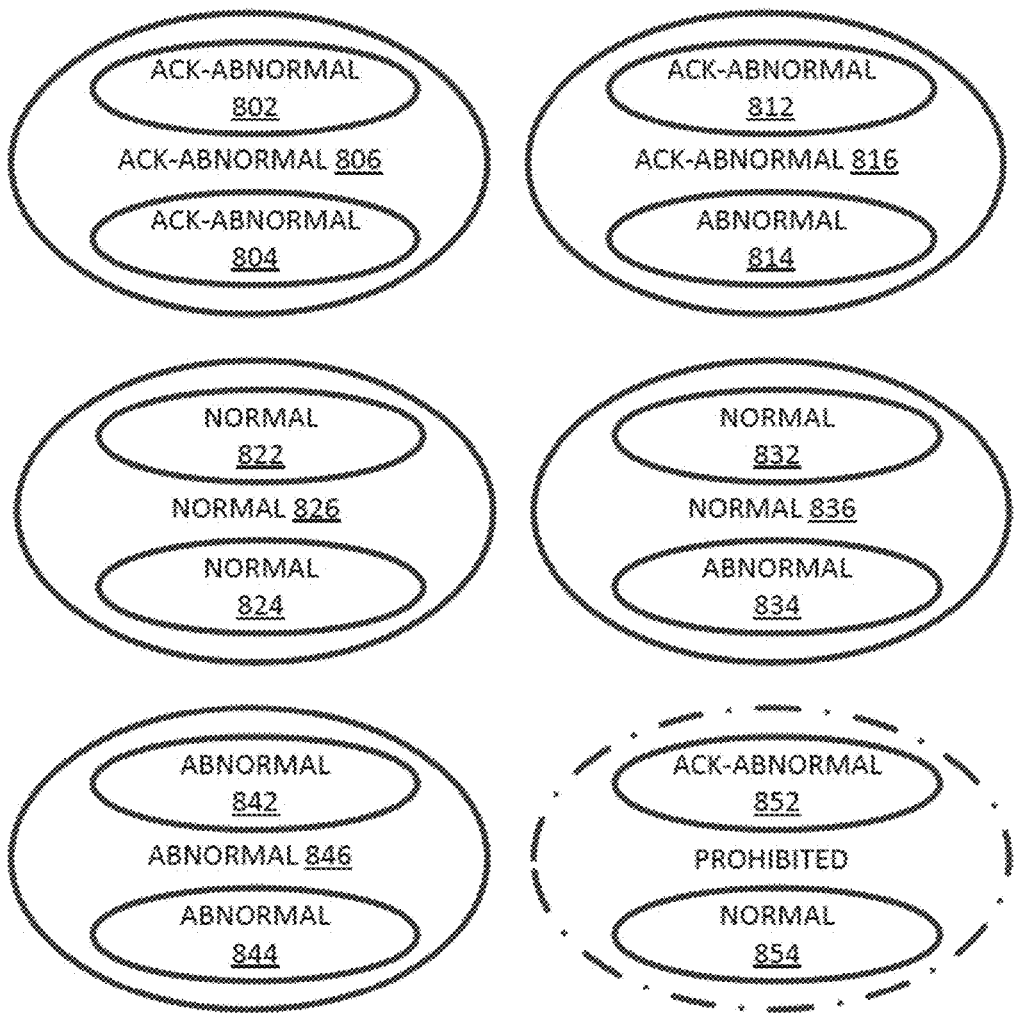
FIG. 8 is a representation of an agglomeration algorithm used in a process executed by the computer of FIG. 4.

At 417, centroids are recalculated for each cluster in preparation for the consideration of new datapoints for addition to clusters. At 418, the clusters are agglomerated based on compatibility and proximity. Clusters can be agglomerated if they are the same or compatible and if they are close enough. As shown in FIG. 8, for clusters whose centroids are closer than threshold Euclidean distance k: 1) an Ack-Abnormal cluster 802 can be agglomerated with another Ack-Abnormal cluster 804 to yield a post-agglomeration Ack-Abnormal cluster 806; 2) an Ack-Abnormal cluster 812 can be agglomerated with an (unacknowledged) Abnormal cluster 814 to yield a post-agglomeration Ack-Abnormal cluster 816; 3) a Normal cluster 822 can be agglomerated with another Normal cluster 824 to yield a post-agglomeration Normal cluster 826; 4) a Normal cluster 832 can be agglomerated with an unacknowledged Abnormal cluster 834 to yield a post-agglomeration Normal cluster 836; 5) an Abnormal cluster 842 can be agglomerated with another Abnormal cluster 844 to yield a post-agglomeration Abnormal cluster 846; and 6) agglomeration of a Ack-Abnormal cluster 852 with a Normal cluster 854 is prohibited.

At 419, clusters are ranked by class and numerosity of included datapoints. Ack-Abnormal clusters have the highest rank, Abnormal clusters have intermediate rank, and Normal clusters have low rank. Within classes, clusters with more datapoints have higher rank than clusters with fewer datapoints.

At 420, alerts are issued to appropriate recipients, e.g., system administrators. Alerts are prioritized according to the ranks of the respective clusters. Alerts for more highly ranked clusters are sent more promptly and with indicators of high priority. Note that, in some scenarios, no alerts are sent for Normal clusters. Accordingly, ranking of Normal clusters may be omitted at 419.

Figure 3:
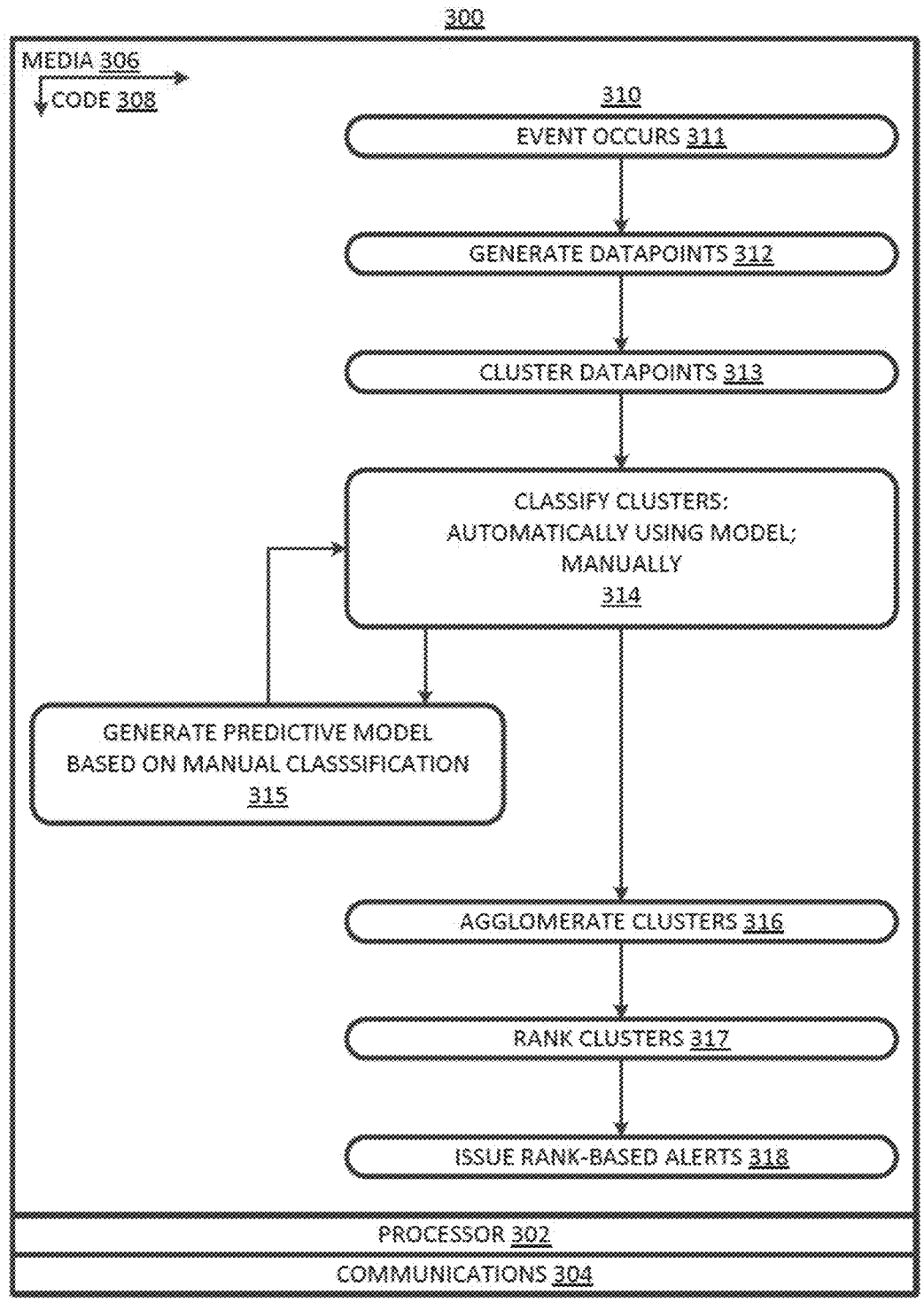
FIG. 3 is a schematic diagram of a computer for implementing an event notification process.
Figure 9:
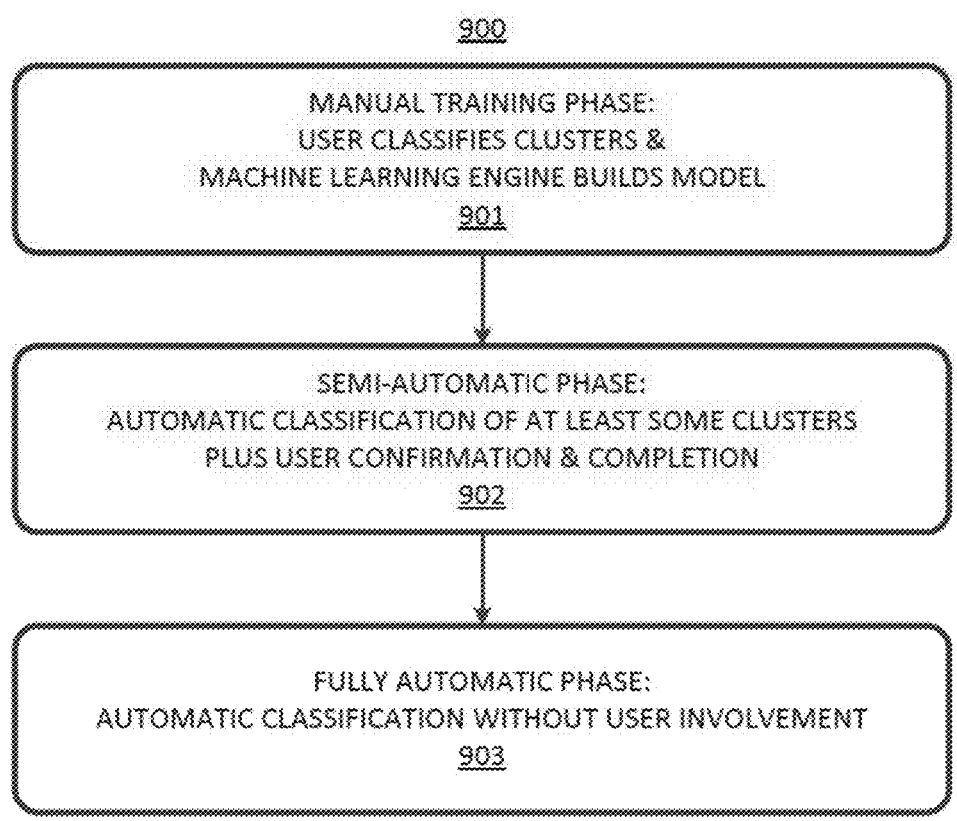
FIG. 9 is a flow chart of a supervised learning process implementable by the computers of FIGS. 3 and 4 as well as by other systems.

A supervised machine learning process 900 is flowcharted in FIG. 9. At 901, iterations of an event-notification process such as those of FIGS. 3 and 4 involve manual classification of clusters. An administrator or other user classifies clusters. A machine-learning engine monitors the user's classification decisions and builds a model to predict the user's classifications.

At 902, the model build during 901 is applied to classify clusters. However, the user reviews the automated classifications. Upon review, the user may ratify (keep) an automated classification of a cluster or change the classification of cluster. In addition, if the model fails to classify a cluster, the user can manually classify it. In some embodiments, the manual decisions during phase 902 are used to refine the model used for automated classifications.

At 903, the model developed during 901 and possibly 902 are used to automatically classify clusters without the involvement of human classification. Thus, an administrator is substantially relieved of responsibility for determining which alerts are to be sent in the fully automatic phase.

Some systems proceed directly from a manual training phase to the fully automatic phase without passing through a semi-automatic phase. Some of these systems permit a user to elect to review automatic-phase classification decisions; other embodiments do not provide such an election. Other systems proceed from the manual-training phase to the semi-automatic phase without ever reaching a fully-automatic phase. In such a case, an administrator remains responsible for classification decisions, but the burden involved is reduced to the extent that the predictions made by the model are accurate.

Due to clustering, a user receives at most one alert per Ack-Abnormal or Abnormal cluster per time period. Also, since datapoints for the same resource taken at "nearby" times may be clustered, a user may receive on the average less than one alert per cluster per time period. As a result of the supervised machine learning, the user may be relieved of responsibility to distinguish data representing normal vs. data representing abnormal events. Also, the discrimination of abnormal vs. normal is improved as it occurs in a vector space instead of on each resource-status parameter individually.

Herein, "system" refers to a set of interacting elements, wherein the elements can be, for example, devices, atoms, or actions. A process is a system in which the elements are actions. A "computer" is a system including media for storing instructions and data, a processor for manipulating data in accordance with instructions, and communications devices for receiving and transmitting data. An "event" is anything that can occur; the events of interest, herein are those that affect the performance of a managed system.

Herein, a resource is an asset that can be drawn on by a person, organization, or system in order to function effectively. A datacenter can be considered a resource, as can its hardware and software components. Resources can be consumable (electricity, processor cycles) or renewable to server, bandwidth). A processor is hardware designed to execute code; a processor can be in the form of an integrated circuit, part of an integrated circuit, or a combination of integrated circuits.

A "datapoint" is a set of values associated with a respective instant or interval of time "Clustering" is spatial grouping, where the space can have any parameters as dimensions.

Machine learning is a type of artificial intelligence (AI) that provides computers with the ability to learn without being explicitly programmed. Machine learning is "supervised" where the learning is based on externally supplied instances, e.g., manual classification decisions. "Manual" means performed by a human or set of humans, regardless of whether hands are involved. "Automatic" means performed without requiring human intervention. "Partially automatic" and "semi-automatic" means that both human and machine input contribute to an action. "Fully automatic" means that no human input is required to achieve a result.

In some cases, all classification in a manual phase are performed manually and all classification in an automatic phase are performed automatically. In other cases, a percentage of classifications performed manually in a manual phase is relatively large compared to a relatively small percentage of classifications performed manually during an automatic phase.

The present invention has been explained in the context of a few non-limiting examples. Various modifications thereto and variations thereupon are provided for by the present invention, the scope of which is determined by the following claims.

What is claimed is:

1. An event notification process comprising iteratively performing a procedure to detect abnormality in computing equipment including:
   generating resource-status datapoints by one or more sensors configured to monitor the computing equipment, each of the datapoints specifying a resource, values of resource-status attributes for the resource, and a time associated with the values of resource-status attributes for the resource;
   clustering the datapoints to yield a plurality of proximity clusters of datapoints;
   classifying each of the proximity clusters into one of at least three classes including: a normal class; an abnormal class; and an acknowledged abnormal class; and
   agglomerating at least one proximity cluster of the normal class with a first proximity cluster of the abnormal class into a first post-agglomeration cluster assigned to the normal class;
   agglomerating at least one proximity cluster of the acknowledged abnormal class with a second proximity cluster of the abnormal class into a second post-agglomeration cluster assigned to the acknowledged abnormal class;
   sending alerts associated with any clusters or post-agglomeration clusters assigned to the abnormal class or acknowledged abnormal class to a communications target in response to the abnormality being detected in the computing equipment, and not sending alerts associated with any clusters or post-agglomeration clusters assigned to the normal class to the communications target.

2. The process of claim 1 further comprising;
   a manual phase such that, in iterations of the procedure occurring during the manual phase,
      a majority of proximity clusters are classified manually rather than automatically, and
      a machine learning engine generates a model of classification decisions made manually during the manual phase; and
   an automated phase such that, in iterations of the procedure occurring during the automated phase, a majority of proximity clusters are classified automatically using the model rather than manually.

3. The process of claim 2 wherein during the automated phase, no proximity clusters are classified manually.

4. The process of claim 1 wherein a proximity cluster of the normal class is never agglomerated with a proximity cluster of the acknowledged abnormal class.

5. The process of claim 4 wherein any post-agglomeration clusters assigned to the acknowledged abnormal class are ranked according to the respective numbers of datapoints in the post-agglomeration clusters, the alerts being prioritized according to the ranks of the respective agglomeration clusters of the acknowledged abnormal class.

6. An event-notification system comprising non-transitory media encoded with code that, when executed using hardware, implements a process including iteratively performing a procedure to detect abnormality in computing equipment including:
   generating resource-status datapoints by one or more sensors configured to monitor the computing equipment, each of the datapoints specifying a resource, values of resource-status attributes for the resource, and a time associated with the values of resource-status attributes for the resource;
   clustering the datapoints to yield a plurality of proximity clusters of datapoints;
   classifying each of the proximity clusters into one of at least three classes including: a normal class; an abnormal class; and an acknowledged abnormal class; and
   agglomerating at least one proximity cluster of the normal class with a first proximity cluster of the abnormal class into a first post-agglomeration cluster assigned to the normal class;
   agglomerating at least one proximity cluster of the acknowledged abnormal class with a second proximity cluster of the abnormal class into a second post-agglomeration cluster assigned to the acknowledged abnormal class;
   sending alerts associated with any clusters or post-agglomeration clusters assigned to the abnormal class or acknowledged abnormal class to a communications target in response to the abnormality being detected in the computing equipment, and not sending alerts associated with any clusters or post-agglomeration clusters assigned to the normal class to the communications target.

7. The system of claim 6 wherein the process further includes:
   a manual phase such that, in iterations of the procedure occurring during the manual phase,
      a majority of proximity clusters are classified manually rather than automatically, and
      a machine-learning engine generates a model of classification decisions made manually during the training phase; and
   an automated phase such that, in iterations of procedure occurring during the automated phase, a majority of proximity clusters are classified automatically using the model rather than manually.

8. The system of claim 7 wherein during the automated phase, no proximity clusters are classified manually.

9. The system of claim 6 wherein a proximity cluster of the normal class is never agglomerated with a proximity cluster of the acknowledged abnormal class.

10. The system of claim 9 wherein any post-agglomeration clusters assigned to the acknowledged abnormal class are ranked according to the respective numbers of datapoints in the post-agglomeration clusters, the alerts being prioritized according to the ranks of the respective post-agglomeration clusters of the acknowledged abnormal class.

11. The system of claim 6 further comprising the hardware.

12. An event-notification process to detect abnormality in a system comprising:
   a) acquiring values for N metrics of the system by one or more sensors configured to monitor the system;
   b) plotting corresponding metric points in an N+1 dimensional space including a dimension for time;
   c) for each metric point,
      at a Euclidean distance less than a threshold k1 from the centroid of a cluster; adding the metric point to that cluster; and
      at a Euclidean distance not less than the threshold k1 from the centroid of any cluster, identifying a new cluster;
   d) assigning each cluster to one of at least three classes including: a normal class; an abnormal class; and an acknowledged abnormal class;

e) agglomerating clusters with centroids less than a distance k2 apart, including:
   agglomerating at least one cluster of the normal class with a first cluster of the abnormal class into a first post-agglomeration cluster assigned to the normal class; and
   agglomerating at least one cluster of the acknowledged abnormal class with a second cluster of the abnormal class into a second post-agglomeration cluster assigned to the acknowledged abnormal class;
f) ranking the clusters of the acknowledged abnormal class higher than the clusters of the abnormal class, and ranking the clusters within each class according to the respective numbers of included metric points; and
g) in response to the abnormality being detected in the system, sending alerts prioritized according to respective ranks.

13. The event notification process of claim 12 further comprising iterating steps a-h, such that:
   during at least one iteration, at least a portion of step d is performed manually; and
   during at least another iteration, at least a portion of step d is performed automatically.

14. The event notification process of claim 13 wherein, during the at least one iteration, a predictive model is generated based on the manual assigning, and, during the at least another iteration, the assigning is based on the predictive model.

15. A system comprising non-transitory media encoded with code that, when executed by a processor, implements the process of claim 12.

\* \* \* \* \*